T. J. MURDOCK.
BOBBIN HOLDER AND THREAD CATCHER.
No, 11,574. Reissued Nov. 24, 1896.
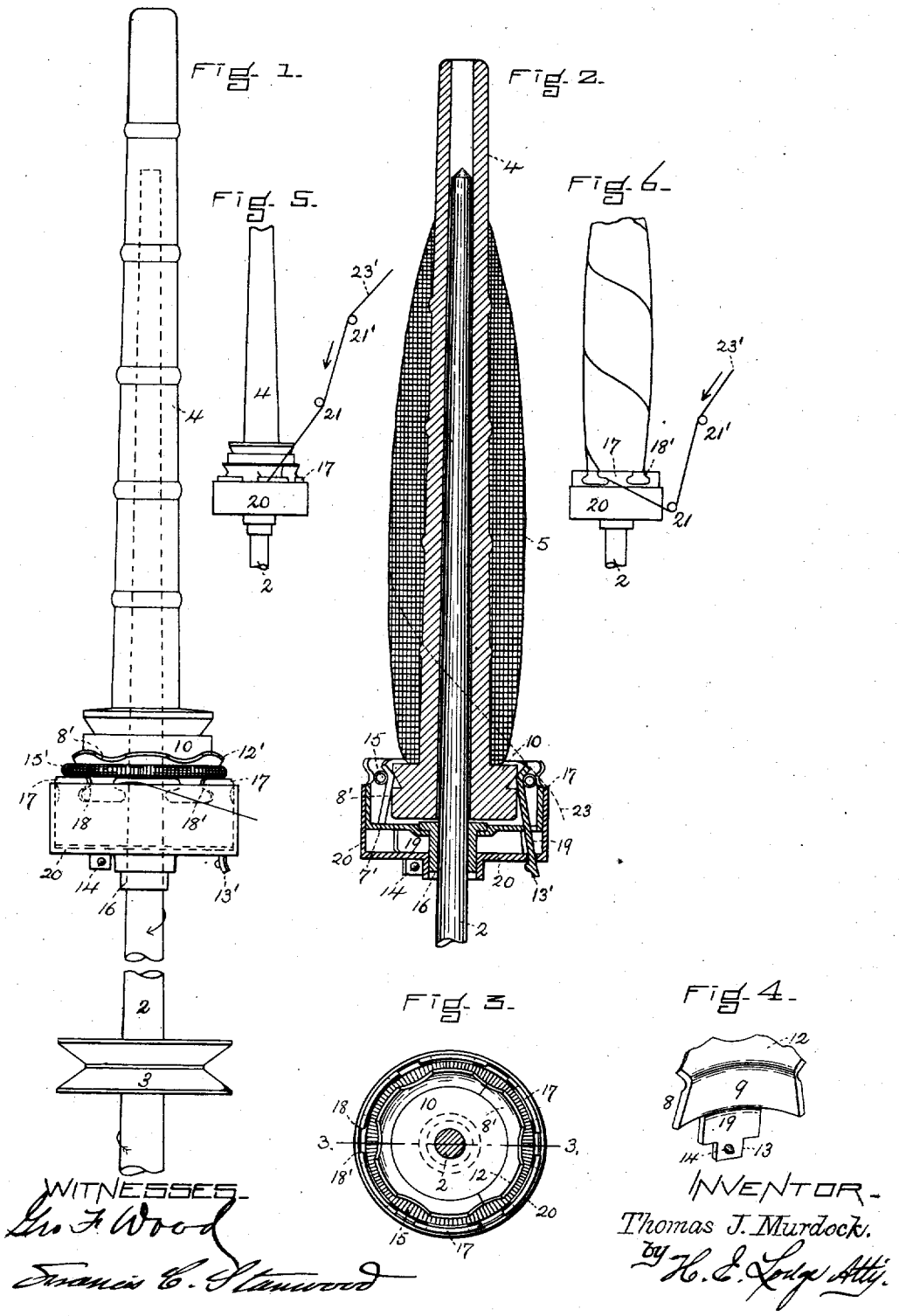
THE NORRIS PETERS CO., PHOTO-LITHO., WASHINGTON, D. C.

UNITED STATES PATENT OFFICE.

THOMAS J. MURDOCK, OF WOONSOCKET, RHODE ISLAND, ASSIGNOR OF ONE-HALF TO JOHN RONEY, OF SAME PLACE.

BOBBIN-HOLDER AND THREAD-CATCHER.

SPECIFICATION forming part of Reissued Letters Patent No. 11,574, dated November 24, 1896.

Original No. 541,377, dated June 18, 1895. Application for reissue filed October 10, 1895. Serial No. 565,295.

*To all whom it may concern:*

Be it known that I, THOMAS J. MURDOCK, a citizen of the United States, residing at Woonsocket, in the county of Providence and State of Rhode Island, have invented certain new and useful Improvements in Bobbin-Holders and Thread-Catchers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to bobbin-holders for service during the process of filling or winding empty bobbins. This mechanism is adapted for general use on mules and ring-spinning frames or twisters, and the action of the faller-wire and the doffing of the bobbins and putting on of empty bobbins are the same as are now generally practiced.

The present method in general use for holding bobbins on spindles consists in winding enough yarn around them to form a packing. On these packings the bobbins are driven to place. When the bobbins are full, the faller-wire is pressed below the heads, guiding the threads to place, and the spindles are made to rotate so that enough yarn is wound around them to cause the threads to break when the bobbins are being removed. Thus the threads remain fast to the spindles in readiness to be raised by the wire and again wound around the empty bobbins. When a full bobbin is removed from the spindle, there always remains fast to it near the head what is is called the "thread" end. If this end is too long, it causes trouble while in the act of being woven into cloth, as it becomes entangled with the true thread while the latter is passing swiftly from the bobbin and causes the thread to break, making waste and imperfect cloth. To overcome this difficulty is one of the features of my invention. Accordingly I have formed a thread-catch which consists of finger-openings to be made in the disk through which the thread passes, the latter being wound diagonally around the outside cup or shell for a short distance and is caught at a single point, so that when the wires are raised that portion of the thread which was around the outer shell comes off and rests at the point where caught, thus leaving the thread end very short.

My improvements are further embodied not only in the bobbin-holder proper, but likewise in mechanism which serves to catch and hold the thread.

The gist of my invention consists in making the bobbin-holder operate the thread catch or holder, so that the act of removing the bobbin when filled causes the thread-holder to grasp the thread which is broken by removal of the bobbin. Conversely, when an empty bobbin is put in place the thread-holder is again operated to release the thread end, which passes on and is wrapped about the bobbin. Thus the waste ends are obviated, an important feature, while the several functions of holding, severing, and releasing the thread are entirely automatic, and the operative exercises no thought or care to see that these important steps are carried out. The very act of taking off a full bobbin and replacing an empty bobbin in the holder is a positive assurance that these several acts—holding, severing of the thread, and releasing of the thread end—are efficiently performed.

The drawings accompanying this specification represent, in Figure 1, a bobbin-holder and thread-holder in side elevation, the empty bobbin resting in the mouth of the bobbin-holder prior to disengagement of the thread end. Fig. 2 is a vertical central section on line 3 3 in Fig. 3. Fig. 3 is a plan with the spindle in section. Fig. 4 is a perspective view of a holding-plate. Fig. 5 is a diagram indicating the thread and faller-wire raised in the act of passing the thread to an empty bobbin, the thread end being held fast. Fig. 6 is a similar view showing the position of thread and wire in the act of catching the thread prior to removal of a full bobbin.

In the above drawings I have represented a spindle at 2 of the usual type adapted for rotation by means of the wheel 3 and arranged to receive a bobbin 4, upon which yarn is to be wound. This material is indicated at 5. One feature of my invention is embodied in the bobbin-holder as composed of a circular disk 7′, firmly affixed to the spindle, while vertically positioned upon its upper surface are two or more holding-plates 8. These latter comprise a body portion 9, which is bent to approximate in curvature to the contiguous portions of the bobbin-head 10, made in the usual manner. The upper edge is flared at 12, while a tongue 13 extends through a hole in the disk 7′ and is held fast to a movable shell by a pin or by forming a knob 14, which prevents its withdrawal. The shape of the plates 8 and their attachment to the disk are such that they can rock or oscillate in lines radially toward and away from the spindle. To compel them to move simultaneously, an annular coiled spring 15 girdles the plates and forces them toward a central point, which is the axis of the spindle. The outwardly-curved edges or lips 12 prevent the spring from slipping off and hold it in place.

From the above description of parts it is evident that a large holding-surface is presented, while the bobbin is positioned centrally of the spindle. Furthermore, the holder is very simple and comprises merely the fixed disk, two or more oscillating holding-plates, and an annular spring. In fact, the number of parts need not exceed four in number, and since the holding-plates can be struck up from sheet metal the holder may be made at a very small expense.

In the winding of bobbins it is very necessary to hold the thread ends at the time a full bobbin is removed, and, furthermore, it is of still greater importance to avoid the thread ends, which present obstructions to good weaving, as is well known to those skilled in the art. To overcome these difficulties and to be able to wind bobbins in which there shall be no thread ends, I have constructed a thread-catch. This may be attached to the bobbin-holder before described or not, as circumstances dictate. In the present instance, as illustrated in Figs. 1, 2, 3, and 4, the bobbin-holder consists of a hub 16, adapted to be fitted to spindles of various sizes, to which it is securely fastened. Mounted upon this hub is a horizontal disk 7′, from which rise a group of circumferential fingers 17, formed with oppositely-disposed points 18 18′ to provide for right or left rotation, as may occur. The disk 7′ is pierced at intervals to admit the intermediate portion 19 of the holding-plates and allow them to oscillate radially of the spindle, the center of oscillation being in the shell 20. This shell or cup is formed with a tubular sleeve which slides upon the hub, while the walls of the shell snugly inclose the exterior surface of the fingers 17, which rise vertically from the fixed disk 7′. (See Figs. 1, 2, and 3.) From the above description it will be seen that the fingers affixed upon the disk 7′ are stationary or fixed points, while the shell is connected to the holding-plates 8′. Hence as the latter engage with the bobbin-head the act of forcibly disengaging said bobbin from the plates 8′ serves to reciprocate the shell. Thus in thrusting the bobbin in between the plates the shell is pushed down and the thread end is released. Conversely, in taking off a full bobbin the shell is pulled up. This last movement causes the shell to coöperate with the fingers, whereby the thread is seized and held, and as the bobbin is lifted up the thread is severed at this particular point.

Reference to Fig. 5 shows the thread-catch in the position last described above with the faller-wire at 21 and the tension at 21′ with the thread end at 23, which is designed to travel in the direction as indicated. The faller-wire is common to all the threads and its manner of mounting and mode of operation are such as are now in general use.

To avoid having loose thread ends and to prevent such, the operative when putting on an empty bobbin proceeds as follows: In lieu of thrusting the bobbin home within the bobbin-holder he positions it in the mouth of the holder, as in Fig. 1, where enough friction occurs to revolve the bobbin. He then raises the wires to the position shown in Fig. 6 as he raises the faller-wire, the end of the thread still being fast, and secures several turns of the thread 23′ about the bobbin sufficient to cause the thread to hold fast thereupon. The bobbin is now thrust home, which act pushes the shell 20 down and releases the thread end which before this act was fast. The faller-wire is then to resume its normal position and the filling of the bobbin proceeds. Conversely, when the bobbin is full the wires are depressed. (See Fig. 6.) This act carries the thread across the path of the revolving fingers, one of which seizes the thread, and when the bobbin is removed the upper edge of the shell engages the fingers 17 and the thread is held fast and broken at this point. While the wires are depressed the thread is wound about the outside of the shell. Hence when the wire is raised, as in Fig. 5, it is unwound from about the shell and comes off to the point where it is caught. In this way loose thread ends are avoided.

What I claim is—

1. The combination with a revoluble spindle, of a bobbin-holder and thread holding and releasing device, said bobbin-holder and thread holding and releasing device comprising means for engaging the bobbin and means, actuated by the movement of a bobbin longitudinally of the said spindle, for catching and releasing the thread: whereby when a full bobbin is doffed the thread will be caught and held and when an empty bobbin is pressed home upon the spindle the thread thus caught will be released.

2. The combination with a revoluble spindle, of a thread holding and releasing device comprising two members one of which is fixed to said spindle and the other of which is adapted to frictionally engage the bobbin and which has a limited vertical movement relative to said spindle, whereby when a bobbin is doffed the said movable member is lifted to catch the thread, and when a new bobbin is operatively connected to the spindle the said movable member is forced downward to release the said thread.

3. The combination with a revoluble spindle, of a disk fast thereto, yielding bobbin-holding devices adapted to engage the bobbin-head frictionally and which are mounted to be movable lengthwise of said spindle, and a thread holding and releasing device comprising two members one of which is vertically movable with the said bobbin-holding devices and the other of which is stationary relative to said disk; whereby when a full bobbin is doffed the thread may be clamped between the two members of said thread holding and releasing device and will be released when the head of a new bobbin is forced between the said bobbin-holding devices to operatively connect the bobbin with said revoluble spindle.

4. A revoluble spindle adapted to carry a bobbin, a disk affixed to said spindle, and a series of fingers circularly grouped and mounted upon the disk, combined with a shell adapted to wipe the fingers and mounted upon the spindle, substantially as described.

5. In a bobbin-holder a revoluble spindle, a disk fast to it, a series of fingers forming part of the disk, combined with a shell loosely mounted upon the spindle, two or more oscillating plates pivoted to the shell and extending through the disk, and means to cause the plates to grip the bobbin-head, whereby the shell may be moved, substantially as specified.

6. In combination with a rotary spindle, and a bobbin-holder thereupon, a group of circumferential thread-grasping fingers mounted on a disk fast on the spindle, and a shell supporting the bobbin-holder and adapted to reciprocate and to coöperate with the fingers, substantially as described and stated.

7. The combination with a revoluble spindle, a transverse disk secured fast to it, and thread-catchers thereon, of a shell loosely mounted on the spindle, two or more rocking plates secured to the shell, said shell being adapted to move upon the thread-catchers and hold the thread, while it is passing about the exterior of said shell, substantially as set forth.

8. The combination with a rotary spindle, a transverse disk affixed to it, and thread-catchers upon the disk and immovable with respect to the spindle, of a shell loosely mounted upon the spindle, two or more rocking plates secured to the shell, and an annular spring disposed circumferentially of the plates, whereby the shell is adapted to reciprocate upon engagement with or disengagement of the bobbin from said spindle, substantially for purposes described.

In testimony whereof I affix my signature in presence of two witnesses.

THOMAS J. MURDOCK.

Witnesses:

JAS. W. GREENE,

ARSENE BÉRARD.